US010638905B2

(12) United States Patent
Kwak (10) Patent No.: US 10,638,905 B2
(45) Date of Patent: May 5, 2020

(54) CLEANER AND CONTROL METHOD THEREFOR

(71) Applicant: LG Electronics Inc., Seoul (KR)

(72) Inventor: Donghoon Kwak, Seoul (KR)

(73) Assignee: LG Electronics Inc., Seoul (KR)

(*) Notice: Subject to any disclaimer, the term of this patent is extended or adjusted under 35 U.S.C. 154(b) by 66 days.

(21) Appl. No.: 15/744,413

(22) PCT Filed: Jul. 5, 2016

(86) PCT No.: PCT/KR2016/007242
§ 371 (c)(1),
(2) Date: Jan. 12, 2018

(87) PCT Pub. No.: WO2017/010722
PCT Pub. Date: Jan. 19, 2017

(65) Prior Publication Data
US 2018/0192843 A1    Jul. 12, 2018

(30) Foreign Application Priority Data

Jul. 13, 2015  (KR) .................. 10-2015-0099184

(51) Int. Cl.
*A47L 9/28* (2006.01)
*A47L 5/28* (2006.01)
*A47L 9/32* (2006.01)

(52) U.S. Cl.
CPC ........... *A47L 9/2863* (2013.01); *A47L 9/2805* (2013.01); *A47L 9/2852* (2013.01); *A47L 5/28* (2013.01);
(Continued)

(58) Field of Classification Search
CPC .... A47L 9/2863; A47L 9/2805; A47L 9/2852; A47L 9/2857; A47L 9/2894; A47L 9/325; A47L 5/28; Y02B 40/82
See application file for complete search history.

(56) References Cited

U.S. PATENT DOCUMENTS

| 6,565,188 B1 * | 5/2003 | Saito ................... B41J 2/16535 |
| | | 347/33 |
| 2004/0134020 A1 | 7/2004 | Conner |

(Continued)

FOREIGN PATENT DOCUMENTS

| JP | 5184505 B2 | 7/1993 |
| JP | 5228088 B2 | 9/1993 |

(Continued)

OTHER PUBLICATIONS

Australian Office Action in Australian Application No. 2016292486, dated Jul. 22, 2019, 4 pages.
(Continued)

*Primary Examiner* — David Redding
(74) *Attorney, Agent, or Firm* — Fish & Richardson P.C.

(57) ABSTRACT

A cleaner includes a cleaner body, a handle, an input unit located at the handle, one or more wheels configured to drive the cleaner body, a motor configured to provide force to the one or more wheels, and a control unit configured to control rotation of the motor based on an input to the input unit. The input unit is positioned at a portion of the handle configured to be held by a user's hand, and includes a lever connected to the cleaner body and configured to rotate about a horizontal axis and a vertical axis with respect to the cleaner body, and a sensor located at the lever and configured to detect a vertical rotation of the lever about the horizontal axis.

11 Claims, 8 Drawing Sheets

(52) U.S. Cl.
CPC .......... *A47L 9/2857* (2013.01); *A47L 9/2894* (2013.01); *A47L 9/325* (2013.01); *Y02B 40/82* (2013.01)

(56) References Cited

U.S. PATENT DOCUMENTS

| | | |
|---|---|---|
| 2006/0021182 A1 | 2/2006 | Kim |
| 2006/0218742 A1 | 10/2006 | Lim |
| 2007/0039122 A1 | 2/2007 | Zahuranec et al. |
| 2007/0061058 A1 | 3/2007 | Gordon |
| 2012/0060322 A1 | 3/2012 | Simonelli |
| 2012/0198652 A1 | 8/2012 | Chong |

FOREIGN PATENT DOCUMENTS

| | | |
|---|---|---|
| KR | 2007102849 B2 | 10/2007 |
| KR | 2013020071 B2 | 2/2013 |
| KR | 101265134 B1 | 5/2013 |
| KR | 2015033554 B2 | 4/2015 |
| KR | 2015063945 B2 | 6/2015 |
| WO | WO2014131106 B2 | 9/2014 |
| WO | WO2015041499 A1 | 3/2015 |
| WO | WO2015084031 B2 | 6/2015 |

OTHER PUBLICATIONS

European Extended Search Report in European Application No. 16824639.5, dated Feb. 19, 2019, 8 pages.
International Search Report and Written Opinion in International Application No. PCT/KR2016/007242, dated Jan. 2, 2017, 18 pages.
Taiwanese Office Action in Taiwanese Application No. 105121587, dated Feb. 8, 2018, 10 pages.

* cited by examiner

CLEANER AND CONTROL METHOD THEREFOR

CROSS-REFERENCE TO RELATED APPLICATIONS

This application is a National Stage application under 35 U.S.C. § 371 of International Application No. PCT/KR2016/007242, filed Jul. 5, 2016, which claims the benefit of Korean Application No. 10-2015-0099184, filed on Jul. 13, 2015. The disclosures of the prior applications are incorporated by reference in their entirety.

FIELD

Embodiments of the present disclosure relate to a cleaner for moving a case to help a user and a controlling method for the same, more particularly, to a cleaner allowing the user to move the case by easy manipulation.

BACKGROUND

A conventional cleaner is the mechanism configured to suck dust and foreign substances on a cleaning surface together with air by using the suction of a motor mounted in a case and filter the dust and foreign substances in the case.

The cleaner having such a function may be classified into an up-right type cleaner and a canister type cleaner. The up-right type cleaner includes a case; and a suction nozzle integrally formed with the case and functioning as a suction hole for dust and foreign substances. The canister type cleaner includes the case and the suction nozzle connected to the case via a connection pipe.

Such the up-right type cleaner may include a cleaner body in which a suction motor generating a suction force is mounted; a suction nozzle sucking dust and foreign substances on a cleaning object surface into the cleaner body, using the suction force generated in the suction motor; and a handle provided on an upper surface of the cleaner body to move the suction nozzle along the cleaning object surface.

Specifically, once the suction motor is put into operation after the electric power is applied to the cleaner body, the suction force is generated and the air containing dust and foreign substances put on the cleaning object surface is sucked into the suction nozzle by such the suction force.

The air containing dust and foreign substances is drawn into the cleaner body and the dust and foreign substances are separated from the air by the cyclone principle in a dust collector mounted in the cleaner body.

The separated dust and foreign substances are collected in the dust collector and the air having them separated therefrom is exhausted outside the cleaner body via an air outlet hole.

Such the conventional cleaner is movable only by the user's force. In case the friction of the cleaning object surface is high or the load of the cleaner is large while the user is moving and using the cleaner, the conventional cleaner has the disadvantage of user's fatigue.

DETAILED DESCRIPTION OF THE INVENTION

Technical Problem

To overcome the disadvantages, an object of the present disclosure is to provide a cleaner which may provide a user with an auxiliary force when a user moves the cleaner and a controlling method for the same.

Another object of the present disclosure is to provide a cleaner which is able to generate the auxiliary force for moving the cleaner, even without the user's changing the location of the hand holding a handle provided in a cleaner body in a state of holding a handle in the hand.

Technical Solution

To achieve these objects and other advantages and in accordance with the purpose of the embodiments, as embodied and broadly described herein, a cleaner comprises a cleaner body; a handle provided in the cleaner body; an input unit provided in the handle to receive a signal input by a user; one or more wheels rotatably provided in a lower portion of the cleaner body to move the cleaner body; a motor connected to the one or more wheels and providing a rotational force; and a control unit rotating the motor in a clockwise or counter-clockwise direction by applying a voltage to the motor according to the signal input to the input unit, wherein the input unit is arranged in a range of portions where the user holds the handle to input a signal even without changing the location of the hand holding the handle, and the input unit comprises a lever bendably connected to the cleaner body and being rotatable with respect to the cleaner body in up-and-down and right-and-left, in other words, vertical and horizontal directions at the same time, and a sensor sensing vertical rotation is provided in the lever.

The control unit may vary the voltage applied to the motor according to the size of the signal input to the input unit by the user.

The input unit may receive two or more different signals from the user to select the clockwise direction rotation or the counter-clockwise direction rotation, while keeping the grip of the handle.

The input unit may include a first pressure sensor and a second pressure sensor for sensing the signal pressed by the user. When the first pressure sensor is pressed, the control unit may rotate the motor in a clockwise direction. When the second pressure sensor is pressed, the control unit may rotate the motor in a counter-clockwise direction.

The first pressure sensor may be arranged in a front portion of the handle and the second pressure sensor may be arranged in a rear portion of the handle.

The first pressure sensor and the second sensor are likely be pressured at the same time. In this instance, if the first pressure sensor is pressed stronger than the second pressure sensor, the control unit may rotate the motor in the clockwise direction. In contrast, if the second pressure sensor is pressed stronger than the first pressure sensor, the control unit may rotate the motor in the counter-clockwise direction.

The control unit may rotate the motor in a counter-clockwise direction when the lever is rotated upward, and the control unit may rotate the motor in a clockwise direction when the lever is rotated downward.

The one or more wheels may comprise a left wheel provided in a left side of the cleaner body and a right wheel provided in a right side of the cleaner body, and the motor may comprise two motors connected to the right and left wheels, respectively, and the control unit may control the two motors independently.

The sensor may sense the horizontal direction rotation of the lever, and when the lever is rotated in a left direction, one motor provided in a right side may be driven in a clockwise direction, and when the lever is rotated in a right direction, the other motor provided in a left side may be driven in the clockwise direction.

The control unit may separate the rotation sensed by the sensor into the vertical direction rotation and the horizontal direction rotation, and the control unit may drive the motor in a different way according to the vertical direction rotation and the horizontal direction rotation.

The sensor may sense a rotation angle and a rotational speed of the lever, and the control unit may drive the motor in a different way according to the rotation angle and rotational speed of the lever, and the voltage applied to the motor may be set as the value gained by adding up the value gained by multiplying the rotation angle by a first constant and the value gained by multiplying the rotational speed by a second constant.

In another aspect of the present disclosure, a controlling method for a cleaner comprises step of sensing a rotation angle and a rotational speed of a lever provided in a handle; separating the sensed rotation angle of the lever into a vertical rotation angle and a horizontal rotation angle; separating the sensed rotational speed of the lever into a vertical rotational speed and a horizontal rotational speed; and driving one or more motors by the control unit according to the rotation angle and the rotational speed of the lever in the vertical direction and the horizontal direction to rotate one or more wheels connected to the one or more motors.

The control unit may apply to the motor a voltage set as a value gained by adding up the value gained by multiplying the rotation angle by a first constant and the value gained by multiplying the rotational speed by a second constant.

When the lever has a rotation angle corresponding to the horizontal rotation, the control unit may drive each of the wheels in a different way by applying different voltages to each of the motors connected to each of the wheels.

Advantageous Effects

The embodiments have following advantageous effects. When moving the cleaner, the user may use the rotational force of the motor as well as the user's force and then move the cleaner with a relatively weak force.

Furthermore, the user is able to input a signal to the input unit without changing the location of the hand holding the handle. Accordingly, the user may use the cleaner more conveniently.

DESCRIPTION OF SPECIFIC EMBODIMENTS

Referring to the accompanying drawings, exemplary embodiments of the present disclosure according to one embodiment of the present disclosure will be described in detail.

Regardless of numeral references, the same or equivalent components may be provided with the same reference numbers and description thereof will not be repeated. For the sake of brief description with reference to the drawings, the sizes and profiles of the elements illustrated in the accompanying drawings may be exaggerated or reduced and it should be understood that the embodiments presented herein are not limited by the accompanying drawings.

Figure 1:
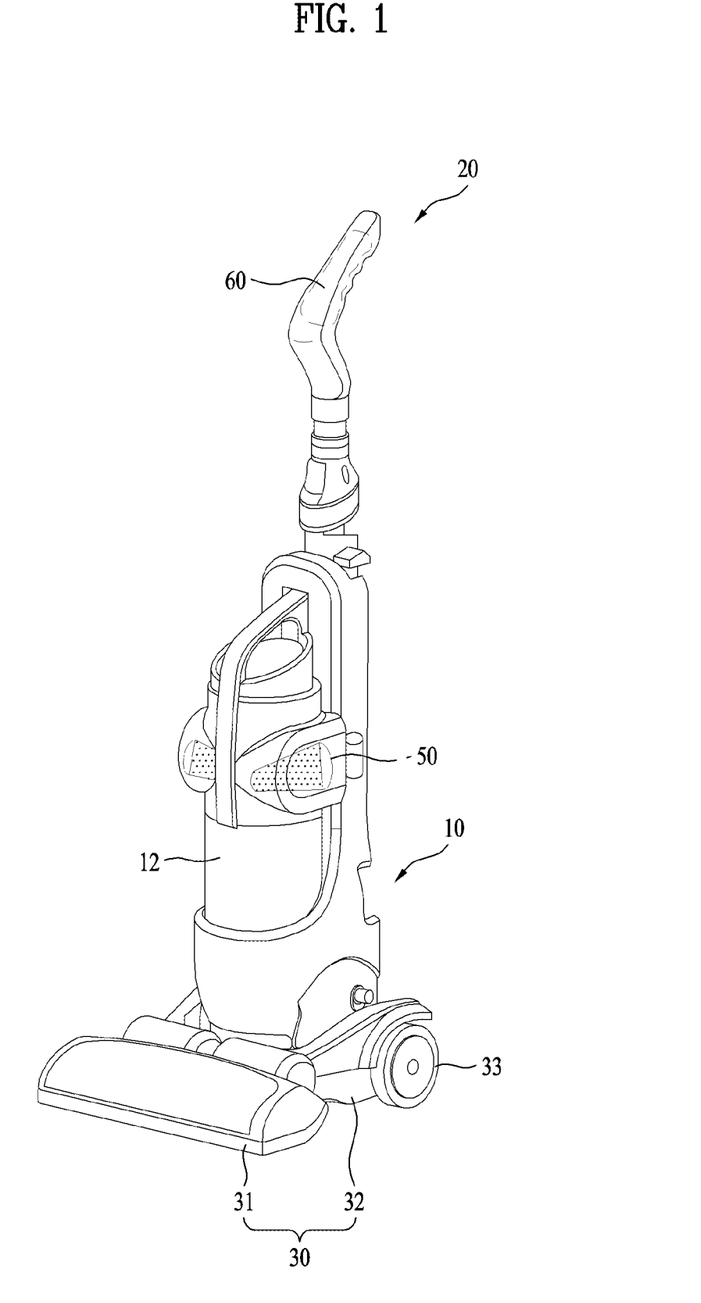
FIG. 1 is a diagram illustrating a cleaner to which examples of the present disclosure are applicable.

Referring to FIG. 1, the cleaner shown in FIG. 1 includes a cleaner body 10 in which a dust collecting case 12 collecting dust and foreign substances on a cleaning object surface is mounted; a suction nozzle 30 provided in a lower portion of the cleaner body 10 to suck dust and foreign substances on the cleaning object surface and seat the case 10 thereon; and a handle 20 provided in an upper portion of the cleaner body 10 and able to be held by the user to perform cleaning.

The cleaner body 10 is disposed on and rotatably coupled to the suction nozzle 30 to vary an arrangement angle with respect to the cleaning object surface. The user may support the cleaner case 10 to keep a state of being rotated toward the cleaning object surface during the overall cleaning process.

The dust collecting case 12 is detachably mounted in a front surface of the cleaner case 10. The dust collecting case 12 includes a dust separation member 50 for separating or filtering dust and foreign substances from the air sucked into the cleaner case 10 by a cyclone principle.

In other words, the air sucked into the cleaner case 10 via the suction nozzle 30 is supplied to the dust collecting case 12. The dust and foreign matters contained in the air supplied to the dust collecting case 12 are filtered by the dust separation member 50 and then collected in the dust collecting case 12 after the filtering. The clean air having the dust and foreign substances separated there from is exhausted outside the cleaner body 10.

The dust collecting case 12 is detachably mounted to the cleaner body 10 and the user is able to detach the dust collecting case 12 from the cleaner body 10 and process the dust and foreign substances collected in the dust collecting case 12.

Meanwhile, the dust collecting case 12 shown in FIG. 1 has a cylindrical shape and the shape of the dust collecting case 12 may be diversified, not limited thereto. For example, the dust collecting case 12 may have a polygonal pillar shape such as a rectangular pillar shape.

The suction nozzle 30 may include a nozzle portion 31 sucking dust and foreign substances scattered on the cleaning object surface, together with air, and a mounting portion 32 where the cleaner body 10 is mounted.

The nozzle portion 31 may move in a back and forth direction and right and left directions (in other words, vertically and horizontally or all directions) with respect to the cleaning object surface so as to suck the dust and foreign substances scattered on the cleaning object surface, when the user performs the cleaning.

A pair of wheels 33 are rotatably provided in both sides of the mounting portion 32 to which the cleaner body 10 is mounted, connected to the nozzle portion 31.

When the nozzle portion 31 is moving along the cleaning object surface, the mounting portion 32 connected to the nozzle portion 31 is also moving and the wheels 33 are rotated to facilitate the movement of the suction nozzle 30 along the cleaning object surface.

Meanwhile, a handle 20 is provided in an upper portion of the cleaner body 10. When performing the cleaning, the user may hold the handle 20 and support the cleaner body 10 so that the cleaner body 10 can support a rotated state.

A user input unit 60 is provided in a portion of the handle 20 which is substantially held by the user in the hand. The user may input a signal to the input unit 60 in a state of firmly holding the handle 20 in the hand.

The input unit 60 is arranged in a range of the portions held by the user, so that the user can input a signal, without moving the hand holding the handle 20. In other words, the handle 20 is the member held by the user to move the cleaner and the input unit 60 is the portion of the handle 20 with which the user's hand substantially contacts.

Accordingly, a plurality of grooves corresponding to the user's fingers may be formed in the user input unit 60 and contact with the fingers when the user holds the handle, so that the grooves may guide the user to input a signal to the input unit 60 easily.

In a state of grasping the input unit 60 in the hand, the user may input the signal to the input unit 60 and move the cleaner.

Figure 2:
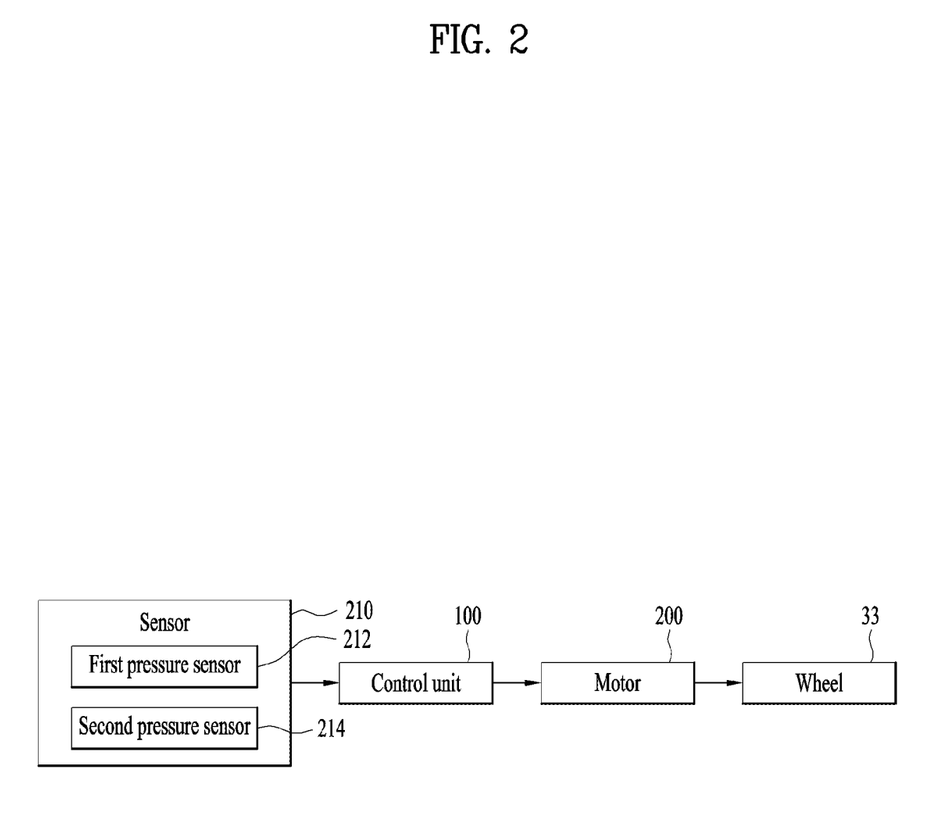
FIG. 2 is a control block diagram of a cleaner in accordance with one embodiment of the present disclosure.

FIG. 2 is a control block diagram of a cleaner in accordance with one embodiment of the present disclosure.

Referring to FIG. 2, the input unit 60 includes a sensor 210 sensing the signal generated by the user.

The sensor 210 may sense the signal input via the input unit 60 by the user and send the input signal to a control unit 100.

In this instance, the sensor 210 may include a first pressure sensor 212 and a second pressure sensor 214 for sensing the pressure applied by the user. The first pressure sensor 212 and the second pressure sensor 214 are arranged in the input unit 60 and senses the pressure applied by the user.

As one alternative example, the sensor 210 may sense a rotation angle or rotation angular speed of the input unit 60 operated by the user, instead of the pressure. For example, the sensor 210 may include a gyro sensor for sensing a varied angle and a rotation angular speed of the input unit 60 in a corresponding direction.

The control unit 100 may apply a voltage to a motor 200 according to the signal sensed by the sensor 210. At this time, the control unit 100 may be implemented to rotate the motor in a clockwise or counter-clockwise direction according to the signal sensed by the sensor 210. The motor 200 is connected to the wheels 33. When the motor 200 is rotated in the clockwise direction, the wheels 33 may be rotated together with the motor 200. When the motor is rotated in the counter-clockwise direction, the wheels 33 may be rotated in the counter-clockwise direction together with the motor 200.

Meanwhile, the control unit 100 may control the voltage applied to the motor 200 according to the size of the signal sensed by the sensor 210. For example, if the signal sensed by the sensor 210 is large, the voltage applied to the motor 200 may be controlled to become large. Accordingly, the motor 200 is able to be rotated at a higher rotational speed and assist the user's moving with a stronger force.

The control unit 100 is implemented to analyze the signal sensed by the sensor 210 and figure out the user's manipulation. When the sensor senses that the user inputs a composite signal, the control unit 100 may separate the signal sent by the sensor 210 and control the motor 200 based on the result of the separation.

In case the motors 200 provided in the wheels 33, respectively, the motors 200 could be driven independently and the control unit 100 may then apply voltages to the motors 200 independently and individually.

The size of the voltage applied to the motor 200 may be varied according to the rotation angle and rotation acceleration detected by the sensor 210.

Figure 3:
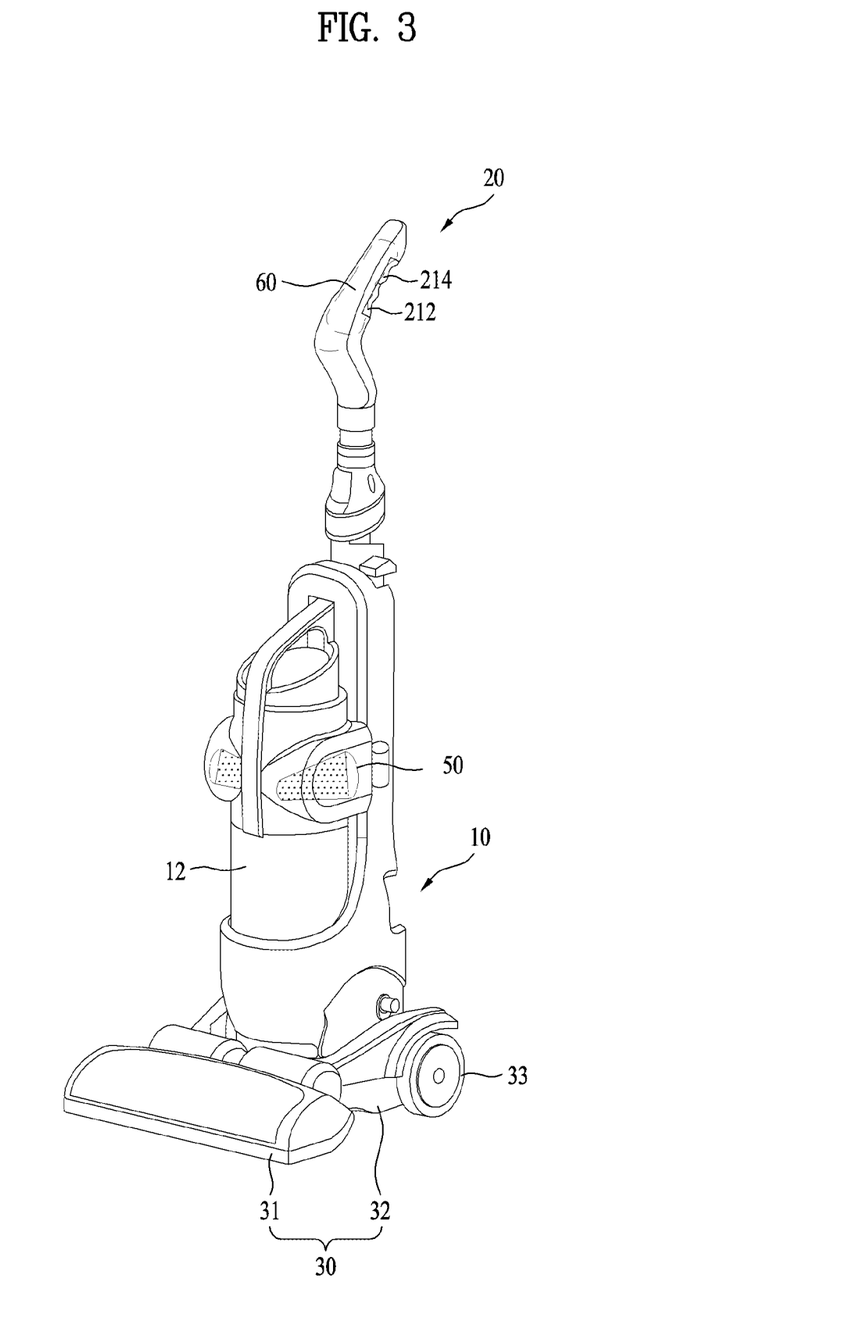
FIG. 3 is a diagram illustrating one example of the cleaner in accordance with the present disclosure.

FIG. 3 is a diagram illustrating one example of the cleaner in accordance with the present disclosure.

Referring to FIG. 3, the input unit 60 may include a first pressure sensor 212 and a second pressure sensor 214 for sensing the signal pressed by the user.

In this instance, the first pressure sensor 212 may be arranged in a front portion of the handle 20 and the second pressure sensor 214 may be arranged in a rear portion of the handle 20. The first pressure sensor 212 and the second pressure sensor 214 are arranged in different positions when the user holds the input unit 60, so as to sense the pressure of the hand applied by the user.

In other words, the user puts the hand on the input unit 60 and inputs a signal to the input unit 60 in a state of grasping the handle 20.

When the user applies a force to the portion where a front part of the hand, in other words, the index finger is put, the first pressure sensor 212 may sense the pressure applied by the user. When the user applies a force to the portion where the little finger is put, the second pressure sensor 214 may sense the pressure applied by the user.

When the first pressure sensor 212 senses the pressure, the control unit 100 is implemented to rotate the motor 200 in the clockwise direction. When the second pressure sensor 214 senses the pressure, the control unit 100 is implemented to rotate the motor 200 in the counter-clockwise direction.

The user applies certain pressure to the first pressure sensor 212 and the control unit 100 determines that the user intended to move the cleaner forward, to drive the motor forward. The user applies certain pressure to the second pressure sensor 214 and the control unit 100 determines that the user intended to reverse the cleaner, to drive the motor 200 backward.

Two or more different signals may be input to the input unit 60 to allow the user to select the clockwise direction or the counter-clockwise direction while keeping the grip of the handle 20.

Meanwhile, the user may put the hand in contact with the first pressure sensor 212 and the second pressure sensor 214, so that both of the first and second pressure sensors 212 and 214 can be pressed.

In this instance, the first pressure sensor 212 senses the user's pressing and the second pressure sensor 214 also senses the user's pressing. If the first pressure sensor 212 is pressed stronger than the second pressure sensor 214, the motor 200 may be rotated in the clockwise direction. In contrast, if the second pressure sensor 214 is pressed stronger than the first pressure sensor 212, the motor 200 may be rotated in the counter-clockwise direction.

To keep the grip of the handle 20, the user can apply force to the overall area of the hand and the force is likely to be applied to the overall portion of the input unit 60. In this instance, the force applied to the front portion is compared with the force applied to the rear portion of the input unit 60 and the operation of the cleaner is able to be controlled based on the result of the comparison.

In one example of the present disclosure, the cleaner may be moved by using the pressure variation applied to the user's hand, without the inconvenience of pressing a button by using the finger with the grip of the handle 20 or operating a button by using the other hand. Accordingly, the user may use the cleaner quite conveniently and comfortably.

Moreover, the cleaner may be moved smoothly in one example of the present disclosure, because the clockwise and counter-clockwise direction rotation of the motor 200 is able to be controlled even without changing the location of the hand holding the handle.

It is usual for the user to perform cleaning while repeatedly moving forward and reversing the cleaner. The forward and backward moving processes are more important than the other processes. The illustrated example of the cleaner in accordance with the present disclosure is able to perform the moving processes, even without changing the location of the user's hand holding the handle. Accordingly, the cleaner in accordance with the present disclosure may provide the user with convenience.

Figure 4:
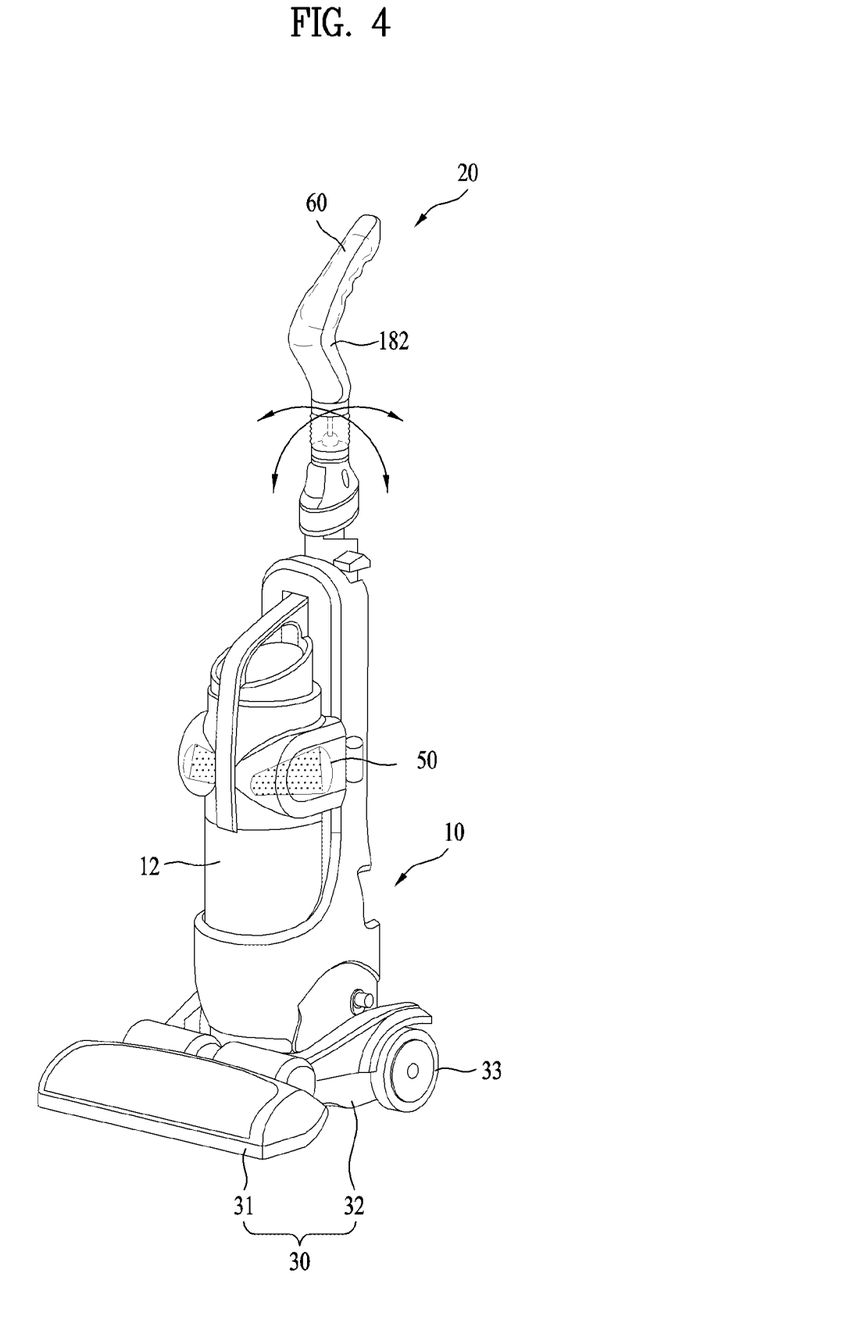
FIG. 4 is a diagram illustrating another example of the cleaner in accordance with the present disclosure.

FIG. 4 is a diagram illustrating another example of the cleaner in accordance with the present disclosure.

Referring to FIG. 4, the input unit 60 may include a lever 182 bendably connected to the cleaner body 10 and rotatable in up-and-down and right-and-left directions, in other words, vertically and horizontally with respect to the cleaner body 10. A sensor 210 may be provided in the lever 182 to sense the vertical rotation.

The lever 182 is coupled to the handle 20 to become rotatable with respect to the cleaner body 10 vertically or horizontally by the user after grasping the handle in the hand. The lever 182 may be rotatable with respect to the cleaner case 10 vertically and horizontally at the same time.

Once the lever 182 is rotated upward, the control unit 100 may rotate the motor 200 in the counter-clockwise direction. Once the lever 182 is rotated downward, the control unit 100 may rotate the motor 200 in the clockwise direction. At this time, the upward rotation means the rotation upward from the floor where the suction nozzle is put and the downward rotation means the rotation toward the floor where the suction nozzle is put.

When the user rotates the lever downward, the cleaner may move forward. When the user rotates the lever 182 upward, the cleaner may reverse the cleaner.

Next, the wheels 33 may include a left wheel provided in a left side of the cleaner body 10 and a right wheel provided in a right side of the cleaner body 10. The motor 200 may include two motors connected to the left and right wheels, respectively. One motor is connected to the left wheel and provides the left wheel with a driving force. The other motor is connected to the right wheel and provides the right wheel with a driving force. The two motors may be driven independently.

In this instance, the control unit 100 may control the two motors independently. The control unit 100 differentiates the voltages applied to one of the motors from the voltage applied to the other, only to rotate the two motors with the rotational forces different from each other. Alternatively, the control unit 100 differentiates a code of the voltage applied to one of the motor from a code of the voltage applied to the other motor, only to rotate the motors in the directions different from each other.

In case the user rotates the lever 182 in the right and left direction, in other words, horizontally, the sensor 210 may sense the horizontal rotation of the lever 182. The lever 182 is rotated to the left and the right motor is rotated in the clockwise direction. The lever 182 is rotated to the right and the left motor of the motor 200 is driven in the clockwise direction.

When the user rotates the lever 182 horizontally, not vertically, the control unit 100 determines that the user intended to rotate the cleaner and controls the rotation directions of the two motors or the rotational speed of the two motors to be different from each other.

When the user rotates the lever 182 vertically and horizontally, the sensor 210 sense the vertical and horizontal rotation and the control unit 100 separate a component related with the vertical direction rotation and a component related with the horizontal direction rotation.

As one alternative example, the sensor 210 may sense the rotation angle and rotational speed of the lever 182. For example, the sensor 210 may include a gyro sensor for sensing the final angle at which the lever 182 is rotated from its initial position and the rotational speed at which the lever 182 is rotated to the final angle.

The control unit 100 may vary the driving of the motor 200 according to the rotation angle and rotational speed of the lever 182. The driving of the motor 200 may be variable according to the voltage applied to the motor 200 and it may be controlled by controlling the voltages applied to the motor 200 according to the rotation angle and rotational speed of the lever 182. At this time, the voltage applied to the motor 200 is set as the value gained by adding up the value gained by multiplying the rotation angle by a first constant and the value gained by multiplying the rotational speed by a second constant. The first constant is different from the second constant. More weight may be given to the rotation angle the user applies finally than the rotation angular speed by enlarging the first constant.

Sensitivity for the user's manipulation may be reflected well when the control unit 100 controls the motor 200 by using both the rotation angle and the rotational speed of the lever 182 simultaneously. Accordingly, the user is likely to move the cleaner body more comfortably.

Figure 5:
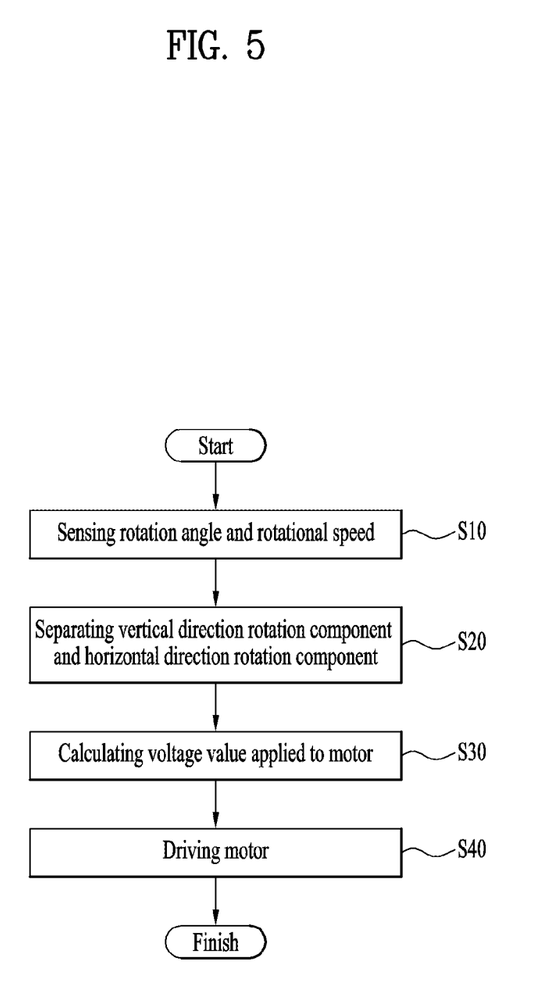
FIG. 5 is a flow chart illustrating steps of a controlling method in accordance with one embodiment of the present disclosure.

FIG. 5 is a flow chart illustrating steps of a controlling method in accordance with one embodiment of the present disclosure.

Referring to FIG. 5, the user may put the hand one the handle 20 to put the cleaner into operation. At this time, the user moves the cleaner while grasping the input unit 60 in the hand.

The user may rotate the lever 182.

The sensor 210 may sense the rotation angle and rotational speed or rotation angular speed of the lever 182 (S10).

The control unit 100 may extract the component related with the vertical direction rotation and the component related with the horizontal direction rotation from the signal sent by the sensor 210 (S20). At this time, the vertical direction rotation angle and the horizontal direction rotation angle are separated. The vertical direction rotational speed and the horizontal direction rotational speed are separated.

The control unit 100 may calculate the value of the voltage applied to the motor 200 and the calculated voltage is applied to the motor 200, so as to drive the motor 200 by using the voltage (S30 and S40). In other words, the control unit 100 may drive the motor 200 differently based on the vertical direction angle or the horizontal rotation angle and then rotate the wheels 33 provided in the cleaner body 10 in the clockwise direction or the counter-clockwise direction.

In this instance, the control unit 100 separately extracts the vertical rotational speed and the horizontal rotational speed of the lever 182 and then rotates the wheels provided in the cleaner body by driving the motor 200 according to the rotational speed.

The value of the voltage applied to the motor 200 is calculated by adding up the value gained by multiplying the rotation angle by a first constant and the value gained by multiplying the rotational speed by a second constant. The first constant is different from the second constant.

If the lever 182 has a rotation angle corresponding to the horizontal direction rotation, the control unit 100 may apply different voltages to the motors 200 mounted in the wheels 33 of the cleaner body 10, respectively, and then drive the two wheels differently.

Figure 6:
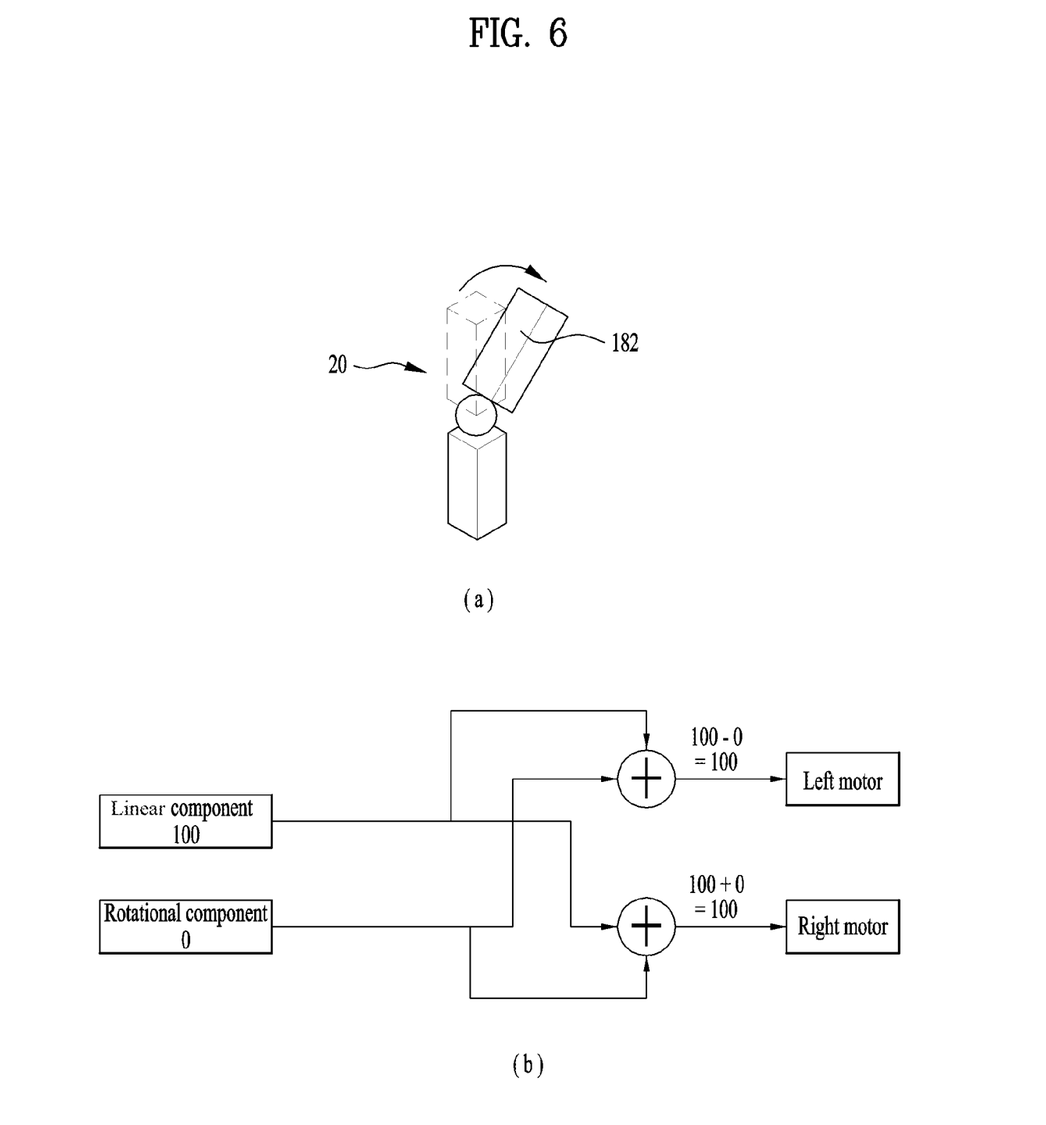
FIGS. 6 through 8 are diagrams to explain operational processes of the cleaner in accordance with one embodiment of the present disclosure.
Figure 7:
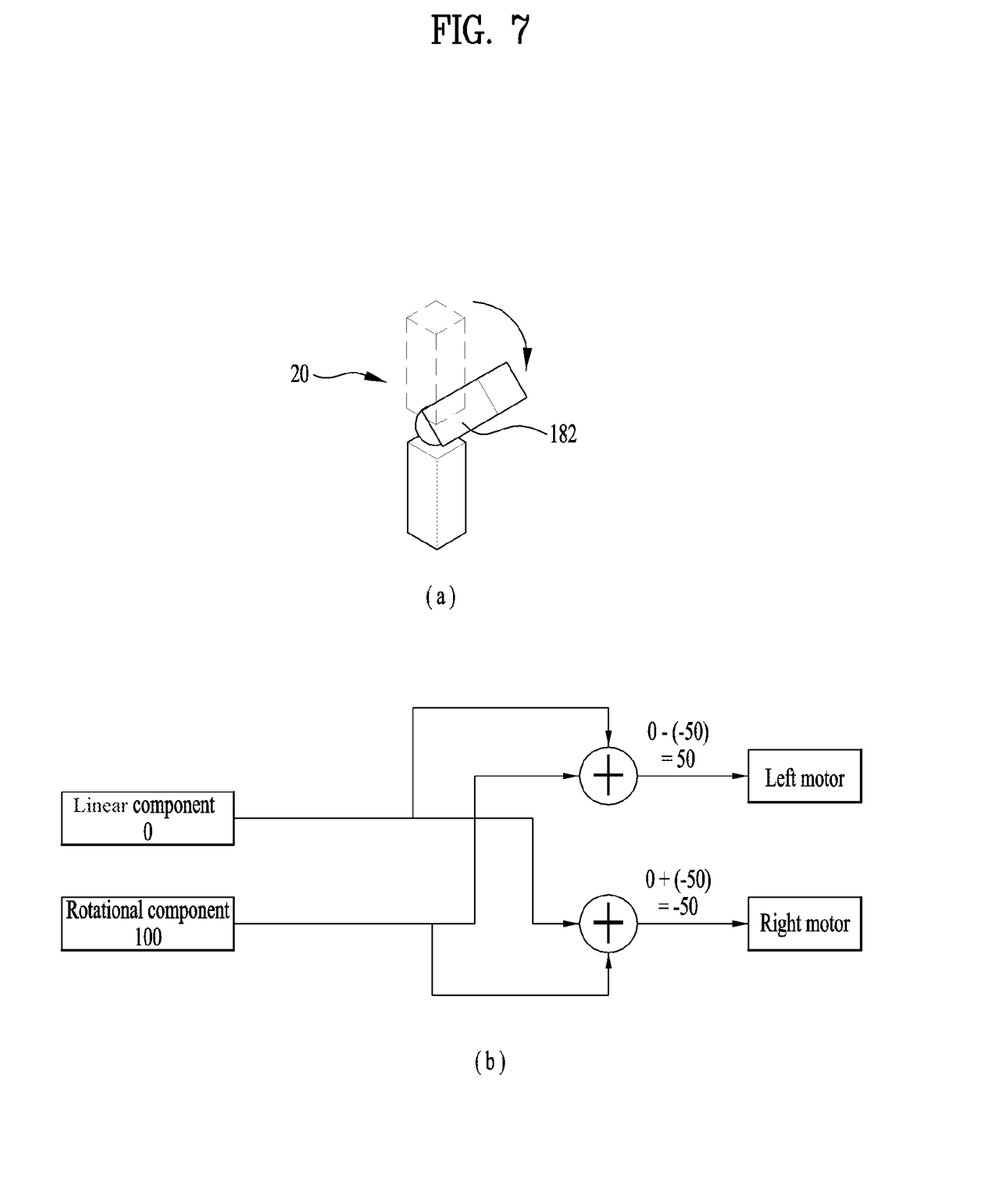
Figure 8:
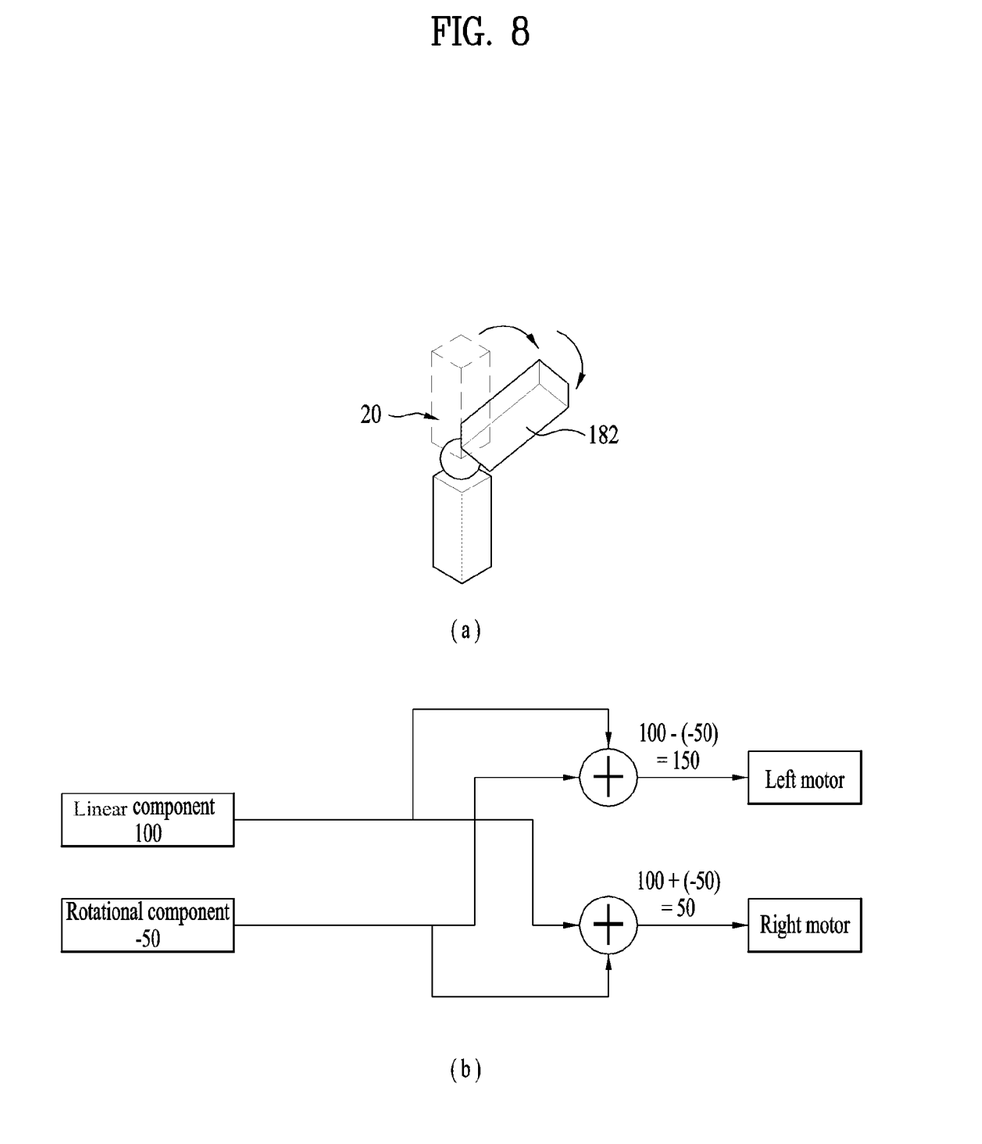

FIGS. 6 through 8 are diagrams to explain operational processes of the cleaner in accordance with one embodiment of the present disclosure.

FIG. 6 illustrates that the user rotates the lever 182 downward.

The sensor 210 senses the downward rotation of the lever 182 and sends the signal related with the downward rotation to the control unit 100.

Since the lever 182 is not rotated horizontally, then a rotational component is '0' and a lineal component is '100'.

Accordingly, considering the rotational component and the lineal component, both the left motor and the right motor may be driven with a driving force of '100' and the cleaner is able to move forward.

FIG. 7 illustrates that the user rotates the lever 182 in a left direction.

The sensor 210 senses the left rotation of the lever 182 and sends a signal related with the left rotation to the control unit 100.

At this time, the lever 182 is not rotated in the up-and-down direction, in other words, vertically, so that the lineal component is '0' and the rotational component is '−50'.

Accordingly, considering the rotational component and the lineal component, the left motor has a driving force of '50' and the right motor has a driving force of '−50' so that the cleaner may be rotated in the right direction, which means that the cleaner performs rotation in place.

FIG. 8 illustrates that the user is bending the lever 182 in an oblique direction. It means that the lever 182 is rotated downward and leftward at the same time.

Since the lever 182 is rotated in the horizontal and vertical direction at the same time, the sensor 210 senses the value for the right-and-left, in other words, horizontal direction and the value for the up-and-down, in other words, vertical direction.

In this instance, the rotational component has a value of '−50' and the lineal component has a value of '100'. The control unit 100 may calculate a value corresponding to the lineal component and a value corresponding to the rotational component by separately extracting the horizontal direction component and the vertical direction component sensed by the sensor 210.

Considering the rotational component and the lineal component at the same time, the left motor has a value of '150' and the right motor has a value of '50' so that the cleaner can move linearly while being rotated in the right direction.

As mentioned above, the user is able to control the moving of the cleaner in accordance with the present disclosure while keeping the grip of the handle, even without changing the location of the hand.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

NUMERAL REFERENCE

| |
|---|
| 10: Cleaner body |
| 20: Handle |
| 30: Suction nozzle |
| 33: Wheel |
| 60: Input unit |
| 100: Control unit |
| 200: Motor |
| 182: Lever |
| 210: Sensor |
| 212: First pressure sensor |
| 214: Second pressure sensor |

What is claimed is:

1. A cleaner comprising:
   a cleaner body;
   a handle coupled to the cleaner body;
   an input unit located at the handle and configured to receive an input from a user;
   one or more wheels rotatably coupled to a lower portion of the cleaner body and configured to drive the cleaner body;
   a motor connected to the one or more wheels and configured to provide force to the one or more wheels; and
   a control unit configured to control rotation of the motor in a first direction or a second direction opposite to the first direction by applying a voltage to the motor based on the input to the input unit,
   wherein the input unit is positioned at a portion of the handle configured to be held by a user's hand, and
   wherein the input unit comprises:
      a lever connected to the cleaner body, and configured to rotate about a first axis that extends in a horizontal direction with respect to the cleaner body and a second axis that extends in a vertical direction with respect to the cleaner body, and
      a sensor located at the lever and configured to detect a vertical rotation of the lever about the first axis that extends in the horizontal direction with respect to the cleaner body.

2. The cleaner of claim 1, wherein the control unit is further configured to determine a value of the voltage applied to the motor based on a magnitude of the input to the input unit by the user.

3. The cleaner of claim 1, wherein the input unit is further configured to, based on the user maintaining a grip of the handle, receive two or more inputs from the user, and
   wherein the control unit is further configured to, based on the two or more inputs, determine one of the first direction or the second direction as a rotation, direction of the motor.

4. The cleaner of claim 1, wherein the control unit is further configured to:
   based on the lever rotating upward
   with respect to the cleaner body, control the motor to rotate in the second direction, and
   based on the lever rotating downward with respect to the cleaner body, control the motor to rotate in the first direction.

5. The cleaner of claim 1, wherein the one or more wheels comprises a first wheel located at a first side of the cleaner body, and a second wheel located at a second side of the cleaner body, wherein the motor comprises a first motor connected to the first wheel, and a second motor connected to the second wheel, and wherein the control unit is further configured to control the first motor and the second motor independently.

6. The cleaner of claim 5, wherein the sensor is further configured to detect a horizontal rotation of the lever about the second axis that extends in the vertical direction with respect to the cleaner body, wherein the second motor is configured to, based on the user rotating the lever in a direction toward the first wheel, rotate the second wheel in the first direction, and wherein the first motor is configured to, based on the user rotating the lever in a direction toward the second wheel, rotate the first wheel in the first direction.

7. The cleaner of claim 6, wherein the control unit is further configured to:

determine, based on the sensor detecting a rotation of the lever, the vertical rotation and the horizontal rotation with respect to the cleaner body; and drive the first motor and the second motor based on the vertical rotation and horizontal rotation of the lever.

8. The cleaner of claim 1, wherein the sensor is configured to detect a rotation angle and a rotational speed of the lever, wherein the control unit is configured to drive the motor based on the rotation angle and the rotational speed of the lever, and wherein the voltage applied to the motor corresponds to a summation of the detected rotation angle multiplied by a first constant and the detected rotational speed multiplied by a second constant.

9. The cleaner of claim 8, wherein the first constant and the second constant have a different value from each other.

10. The cleaner of claim 3, wherein the two or more inputs comprise a first input corresponding to a rotation of the motor in the first direction, and a second input corresponding to a rotation of the motor in the second direction.

11. The cleaner of claim 10, wherein the control unit is further configured to:

compare a magnitude of the first input with a magnitude of the second input;

based on the magnitude of the first input exceeding the magnitude of the second input, drive the motor to rotate in the first direction; and based on the magnitude of the second input exceeding the magnitude of the first input, drive the motor to rotate in the second direction.

* * * * *